US007180446B2

(12) United States Patent  
Wang et al.

(10) Patent No.: US 7,180,446 B2  
(45) Date of Patent: Feb. 20, 2007

(54) CONTINUOUS INTEGRATION BASED SATELLITE NAVIGATIONAL SIGNAL ACQUISITION

(75) Inventors: Chi-Shin Wang, Half Moon Bay, CA (US); Zhike Jia, Santa Clara, CA (US); Hansheng Wang, San Jose, CA (US)

(73) Assignee: Centrality Communications, Inc., Santa Clara, CA (US)

( * ) Notice: Subject to any disclaimer, the term of this patent is extended or adjusted under 35 U.S.C. 154(b) by 23 days.

(21) Appl. No.: 11/179,353

(22) Filed: Jul. 12, 2005

(65) Prior Publication Data

US 2007/0013583 A1 Jan. 18, 2007

(51) Int. Cl.
*G01S 5/14* (2006.01)
(52) U.S. Cl. .................. 342/357.15; 375/150
(58) Field of Classification Search ............ 342/357.15
See application file for complete search history.

(56) References Cited

U.S. PATENT DOCUMENTS

| | | | |
|---|---|---|---|
| 4,578,678 A | 3/1986 | Hurd | 343/357 |
| 4,601,005 A | 7/1986 | Kilvington | 364/602 |
| 4,701,934 A | 10/1987 | Jasper | 375/1 |
| 4,785,463 A | 11/1988 | Janc et al. | 375/1 |
| 4,998,111 A | 3/1991 | Ma et al. | 342/352 |
| 5,271,034 A | 12/1993 | Abaunza | 375/1 |
| 5,663,734 A | 9/1997 | Krasner | 342/357 |
| 5,781,156 A | 7/1998 | Krasner | 342/357 |
| 5,796,787 A | 8/1998 | Chen et al. | 375/326 |
| 5,884,214 A | 3/1999 | Krasner | 701/207 |
| 6,392,590 B1 | 5/2002 | Kagemoto | 342/357.06 |
| 6,407,699 B1 | 6/2002 | Yang | 342/357.12 |
| 6,452,961 B1 | 9/2002 | Van Wechel | 375/142 |
| 6,466,958 B1 | 10/2002 | Van Wechel et al. | 708/422 |
| 6,596,976 B2 | 7/2003 | Lin et al. | 244/3.2 |
| 6,606,349 B1* | 8/2003 | Kudhrethaya et al. | 375/150 |
| 6,611,756 B1 | 8/2003 | Chen et al. | 701/213 |
| 6,725,157 B1 | 4/2004 | Yu | 701/213 |
| 6,934,322 B2* | 8/2005 | King et al. | 375/150 |
| 2002/0015456 A1* | 2/2002 | Norman et al. | 375/340 |
| 2002/0025011 A1 | 2/2002 | Sullivan | 375/343 |
| 2005/0050293 A1 | 3/2005 | Falk et al. | 711/173 |

OTHER PUBLICATIONS

Persson B. et al "CDMA Code Synchronization Using Segmented Matched Filter With Accumulation and Best Match Selection," Proc MILCOM 2002, Oct. 7-10, 2002, pp. 976-981, vol. 2.*

* cited by examiner

*Primary Examiner*—Gregory C. Issing
(74) *Attorney, Agent, or Firm*—Orrick, Herrington & Sutcliffe LLP

(57) ABSTRACT

A method and device to acquire navigational satellite signals combines non-coherent and coherent integrations and can efficiently acquire both strong and weak signals. Successive steps eliminate lower powered and less likely combinations of code offsets and carrier frequencies or dwells of a given satellite signal. Only remaining dwells then are correlated and integrated over larger time duration to obtain the most probable dwell or dwells, which results in reduced computational load. The selection of most likely dwells is based on Parseval's theorem on equivalence of power in time and frequency domains. An optimal estimator algorithm efficiently estimates the probable navigation data bits embedded in the received signal. In case of an ambiguity due to several possible dwells, the steps are repeated with a new set of signal samples.

18 Claims, 3 Drawing Sheets

CONTINUOUS INTEGRATION BASED SATELLITE NAVIGATIONAL SIGNAL ACQUISITION

FIELD OF THE INVENTION

The present invention relates generally to navigational signal receivers. More specifically, it relates to techniques for efficient acquisition of signals from global navigational satellite systems.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. It is possible to have more than twenty-four satellites due to the presence of some spare satellites in the GPS constellation. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from sufficient number of satellites, a GPS receiver can calculate its position, velocity, altitude, and time.

The GPS receivers can operate in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PN code phase. Each satellite transmits a unique PN code which repeats every millisecond. The receiver locally generates a replica frequency and a replica code phase and correlates these with the received satellite signals. The PN code has to be searched in at least 2046 phases and the frequency search depends upon the Doppler frequency due to relative motion between the satellite and the receiver. Additional frequency variation may result due to local oscillator instability.

When the satellite signal is strong the receiver can detect the presence of a satellite signal in a short time. But when the signal is weak a long correlation time is needed and the integration or correlation needs to be coherent which requires large computation load. Signals may be weak due to an obstruction by foliage or buildings, or if the receiver is operating indoors. Special techniques are required to acquire the signal under the above mentioned conditions. One of the more widely used technique is known as assisted GPS (AGPS), disclosed in U.S. Pat. No. 5,884,214. This technique is mainly used with GPS receivers in cell phones. In this method a cellular base station or server provides the ephemeris, time and data bit edge position to the GPS receiver in the cell phone so that it may acquire the satellite signal. This technique requires synchronization with the base station or server, and the service has to be provided by the cell phone operator. Consequently, it results in extra subscription charges and base station augmentation.

Due to the disadvantages with AGPS, it is desirable to be able to acquire weak GPS signals without outside assistance. Examples of this approach are disclosed in U.S. Pat. Nos. 5,271,034, 6,392,590, and 6,611,756. Most of these techniques, however, are not suitable when the signal is extremely weak due to the large computation involved in carrying out lengthy integrations and fast Fourier transforms (FFTs). In these techniques, the integration involves the summing of one-millisecond correlation values. A correlation value is obtained by comparing the samples of input signal with locally available PN code samples over a one-millisecond interval. The difference between the agreement and disagreement of the samples is the correlation value. In the case of perfect correlation and no noise, the correlation value is equal to the number of samples in the one millisecond length, e.g., if the samples per code-length of one millisecond is 2046, then the perfect correlation value is 2046. But if the codes are not aligned this value may be $\pm 130$ or $-2$. Thus, in this case the detection of the received signal can be determined easily. In the presence of noise, however, the correlation value may not be 2046, but may have a lower value, and when the signal is extremely weak it may not be able to determine the correct correlation. In these circumstances, the receiver can estimate the correlation value over several consecutive milliseconds to arrive at a reasonable value. This summing up over several milliseconds is also known as coherent integration. The coherent integration requires that there are no sample reversals due to the residual carrier frequency. If there are reversals due to carrier frequency, the correlations may be carried out over non-reversed parts of the sample lengths and may be added by squaring each part. This is known as non-coherent integration. Compared to non-coherent integration, coherent integration provides better results for the same total length. But coherent integration requires very low residual carrier frequency and high computational load. Furthermore, in many cases the receiver processor may not be able to meet the computational requirements of coherent integration. In many cases the received GPS signals may have power ranges from strong to extremely weak, and the receiver may use same algorithm for all the signal strengths with the associated inefficient use of computational power.

Accordingly, there is a need in the art for a GPS receiver that is able to acquire strong, weak, and extremely weak GPS signals in standalone mode while not demanding a large computational load.

SUMMARY OF THE INVENTION

In one aspect, the present invention provides a satellite navigational signal receiver having reduced computational load even under extremely weak signal conditions. The large reduction in computational load is derived through continuous retention of surviving dwells and rejection of unlikely dwells. In one embodiment, the method includes signal acquisition in multiple processing stages and makes use of the equivalence of the signal power in time and frequency domains (i.e., Parseval's theorem). A first stage of processing involves noncoherent integration with the coherent integration interval extending from one to several milliseconds.

Most of the dwells or code offset and carrier frequency combinations are eliminated during initial stages, when the computed power is found to be less than a threshold. The threshold may be determined by correlating with a PN sequence that is not present in the received signal. In a final step of acquisition, which is also known as fine acquisition, a long coherent integration is carried out on the selected dwells. A fast Fourier transform (FFT) of appropriate length determines the fine frequency resolution required in fine acquisition. The FFT components with power less than the average power (as determined through the use of Parseval's theorem) are rejected and removed from further considerations. The fine acquisition also involves an optimal estimation algorithm to determine the navigation data bits embedded in the length of the samples used in the coherent integration.

Because the unlikely dwells are rejected at the initial stages, computational load is reduced significantly (e.g., by as much as 95%) as compared to the present day practice of noncoherent integration for all possible dwells. A further advantage of this method is that the computation naturally adapts to the signal strength, so that the acquisition of strong signals uses less computational power as the acquisition of weak signals.

DETAILED DESCRIPTION

Figure 1:
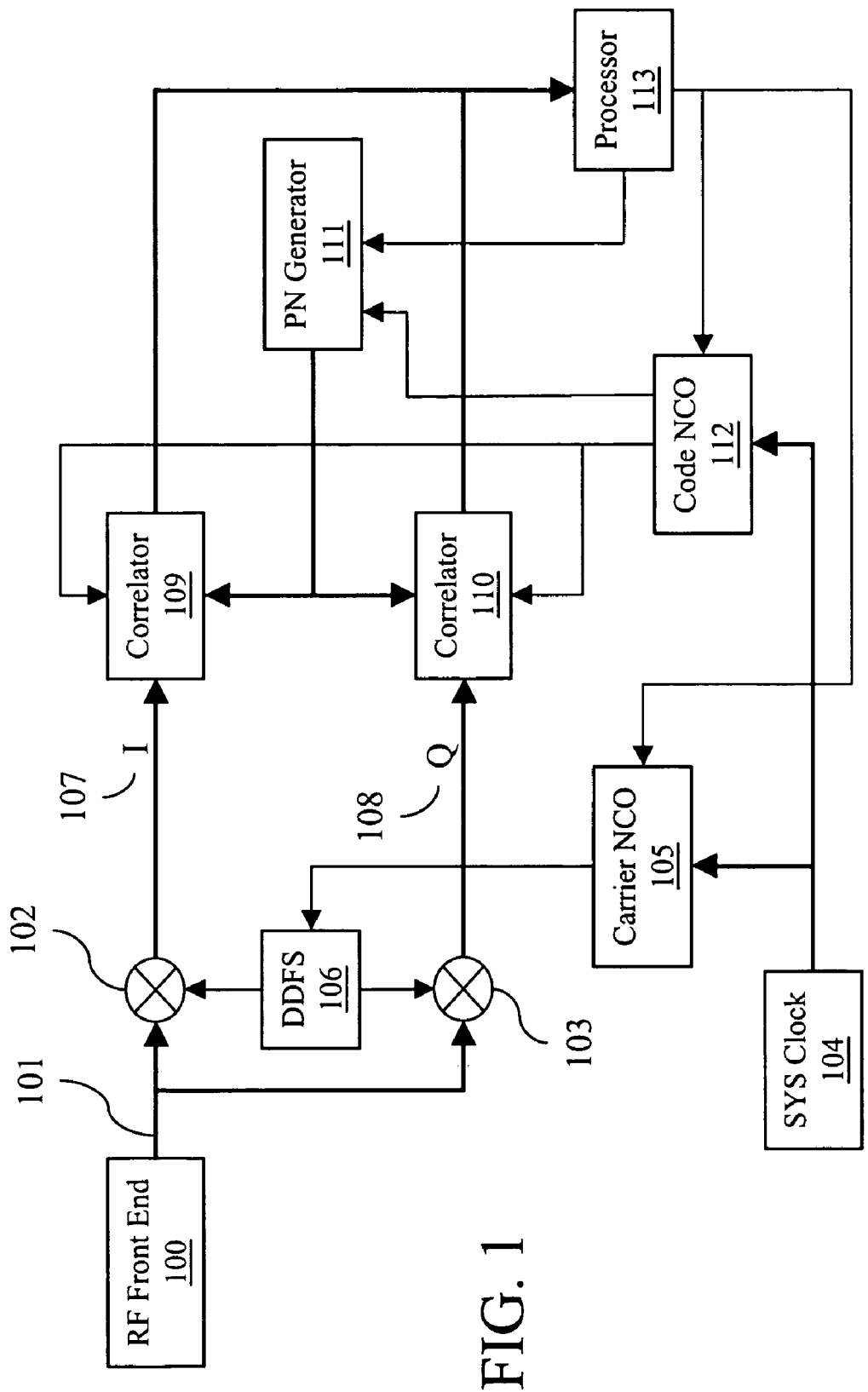
FIG. 1 is a block diagram illustrating a GPS receiver according to an embodiment of the present invention.

A preferred embodiment of a receiver according to the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PN sequence generated by a PN generator 111. The PN-sequence corresponds to the channel being processed by the baseband section at that time. The PN sequence generator is driven by code NCO 112. The local code generator frequency is made equal to the code rate of I and Q paths by corrective feedback from processor 113 to the code NCO 112. In addition, processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 may be a digital signal processor (DSP) core. Subsequent processing of the signals take place in the processor 113, as will be described in detail below. Additional details of the receiver baseband section described above are contained in U.S. patent application Ser. No. 11/123,861 filed May 6, 2005, which is incorporated herein by reference.

The DSP core 113 receives one millisecond integrated (correlated) I and Q values from the GPS baseband section described above. In order to acquire a GPS signal in the DSP processor, all dwells (carrier frequency, code offset) are searched. It is a two-dimensional search. Coherent integration and noncoherent integration are two commonly used integration methods to acquire GPS signals. Coherent integration provides better signal gain at the cost of larger computational load, for equal integration times.

The power associated with noncoherent integration with one millisecond coherent integration is $$\text{Power} = \sum_{n=0}^{N-1} (I(n)^2 + Q(n)^2) \quad (1)$$

and the power associated with coherent integration is $$\text{Power} = \left(\sum_{n=0}^{N-1} I(n)\right)^2 + \left(\sum_{n=0}^{N-1} Q(n)\right)^2 \quad (2)$$

where I(n) and Q(n) denote the one-millisecond integration values from the baseband section at interval n, and N denotes the desired number of one-millisecond integration intervals. For coherent integration, the valid frequency bandwidth is narrowed so the frequency step is smaller than in noncoherent integration, which means that there are more frequency bins to search when using coherent integration. One method to mitigate this impact is to use an FFT method for coherent integration so that more frequency bins can be checked at a time. However, one additional parameter (i.e., bit edge) needs to be detected. Thus, when used as it is, this FFT based method results in increased computational load.

In order to decrease the computational load without affecting the sensitivity of the receiver, an embodiment of the present invention employs a multi-step acquisition scheme composed of two parts: coarse acquisition and fine acquisition.

Coarse Acquisition

Figure 2:
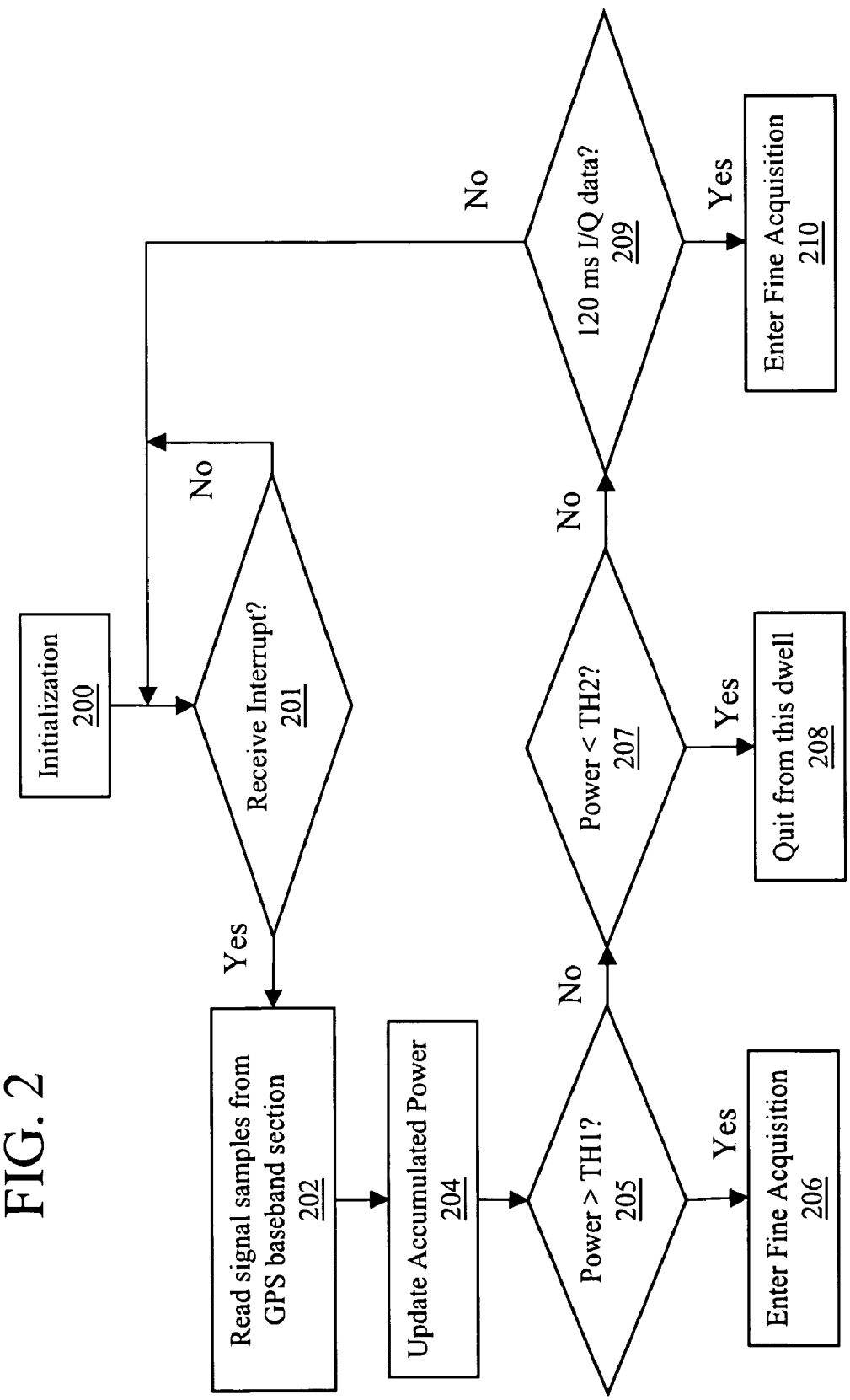
FIG. 2 is a flow chart of a process of coarse acquisition according to an embodiment of the present invention.

Coarse acquisition adopts a noncoherent integration method. The criterion to declare success of coarse acquisition is the accumulated power exceeding a preset threshold (e.g., threshold TH1 shown in FIG. 2). Because signals received from different satellites typically have different received signal power levels, they typically have different integration times for acquisition. Consequently, it is not efficient to use a fixed integration time for every satellite signal. Accordingly, in a preferred embodiment of the present invention a continuous integration method for GPS signal acquisition is provided. The noncoherent integration is terminated if the signal acquisition is achieved. At the same time, some dwells are removed from the search list by comparing the accumulated power with a lower threshold (e.g., threshold TH2 as shown in FIG. 2). So at the beginning of the first stage of acquisition, all the possible dwells are in the search list. The number of dwell entries in the search list decreases every millisecond as some dwells are removed from the list.

In the case of coarse acquisition, the carrier frequency search step is about 500 Hz, and the code offset search step is half of a PN sequence chip. So if acquisition is achieved after the coarse acquisition, the error in carrier frequency is ±250 Hz, which is still too large for position-velocity-time (PVT) calculation, or even the tracking loop. So a fine acquisition stage to fine tune the carrier frequency is needed. The FFT based coherent integration is used in fine acquisition and an optimal estimation algorithm requiring reduced computational load is used to detect the navigation data bit edges.

For strong signals, the signal acquisition can be achieved by the process of coarse acquisition, and carrier frequency is further fine tuned by the process of fine acquisition. For weak signals, acquisition through coarse acquisition may not be possible even if the integration time reaches the upper limit. In that case, a long coherent integration to boost signal power at correct frequency bin (obtained through an FFT) is used as a second step.

A detailed explanation of the above procedure is given here. At the end of every millisecond DSP firmware gets a pair of $I(n)$, $Q(n)$ values and can use them to update the calculation of the accumulated power, Power(n). The noncoherent integration process employed may be illustrated mathematically as follows:

$$\text{Power}(0) = I(0)^2 + Q(0)^2 \quad (3)$$

$$\text{Power}(1) = \text{Power}(0) + I(1)^2 + Q(1)^2 \quad (4)$$

$$\text{Power}(n) = \text{Power}(n-1) + I(n)^2 + Q(n)^2 \quad (5)$$

Each of the noncoherent integration power values Power(n) is compared with a high and low pre-computed threshold pair, TH1 and TH2. If the power is higher than the upper threshold (i.e., Power(n)>TH1), acquisition is declared and the corresponding dwell is retained for the final fine acquisition to fine tune the carrier frequency. If on the other hand the power is lower than the lower threshold (i.e., Power(n)<TH2) then the corresponding dwell is rejected from further consideration. If the power is higher than the lower threshold and lower than the high threshold then the dwell is retained for further integration. This procedure is repeated in the subsequent integrations with suitable thresholds.

The device for implementing the above power accumulation may use a table such as Table 1, which contains the parameter values of each dwell (carrier frequency and code offset), latest power and I/Q values. The latest 120 milliseconds I/Q data for each dwell are retained for possible coherent integration use in later step.

TABLE 1

Power Table

| Index | Carrier frequency (1 WORD) [1] | Code offset (1 WORD) | Latest power (2 WORDs) | Latest I/Q (256 WORDs) |
|---|---|---|---|---|
| 1 | Frequency 1 | 0 | Power(n) [2] | I(0)/Q(0)... I(n)/Q(n) |
| 2 | Frequency 1 | 1 | Power(n) | I(0)/Q(0)... I(n)/Q(n) |
| ... | ... | ... | ... | ... |
| Number of frequency bins to search* 2046 | Frequency of last bin | 2045 | Power(n) | I(0)/Q(0)... I(n)/Q(n) |

[1] Although the length of carrier frequency is 2 WORDs (16 bits per WORD), we only use 1 WORD to represent this variable because the difference of adjacent carrier frequency bins is only 500 Hz and 1 WORD is enough to represent the difference.
[2] For 120 ms integration, n = 0, 1, 2, ..., 119.

The memory size of this table is $2046 \times (1+1+2+240) \times N_f = 499224 \, N_f$ WORDs, where $N_f$ is the number of frequency bins to search, 2046 is the number of code phases, 240 is the number of $I(n)$ and $Q(n)$ values for each dwell, there is 1 WORD for each code phase, 1 WORD for each frequency, and 2 WORDS for each power value. For a hot start, the Doppler frequency offset may be predicted very precisely, and at the same time the local TCXO frequency error may be eliminated by temperature compensation techniques. So, in this case, $N_f$ is equal to 1. Consequently, the memory usage of this power table is about 500 K WORDs for a hot start. However, for a cold start a larger memory for the table is required because of the higher value of $N_f$. The size indicated above, however, is only for the worst case in which no (carrier frequency, code offset) dwell is removed during the process. Normally, most (up to 95%) of dwells are removed from the search list as integration time extends. So the size of Table 1 is much smaller than the worst case.

As shown in FIG. 2, the updated power is compared with the threshold TH1 every millisecond as power values are accumulated. If Power(n)>TH1(n) then the coarse acquisition may be declared successful and can proceed to the next stage, i.e. fine acquisition. In the above case the threshold is set to $$TH1(n) = n\rho^n \text{Threshold\_}P_{high}, \quad (6)$$

where Threshold_$P_{high}$ is the threshold to enter coarse acquisition for 1 millisecond coherent integration, and $\rho$ is the attenuation factor. The longer the integration time is, the relatively lower the threshold that is adopted. For example, if $\rho=0.995$, then at end of 120 millisecond integration, $\rho^{120}=0.55$. This corresponds to the requirement that weaker signal needs longer integration time. The determination of the 1 ms threshold Threshold_$P_{high}$ is based on the received signal level. This may be calculated theoretically or can be set empirically before receiver initializes and then store this value in the appropriate memory location.

Besides the threshold of power, another kind of threshold that can be used is the threshold of ratio, Threshold_$R_{high}$. That is, $$TH1(n) = \text{Threshold\_}R_{high} \times \text{average\_power} \quad (7)$$

where Threshold_$R_{high}$=(Power of 1 millisecond correlation for which the signal can be detected)/(Average power of 1 millisecond correlation over all (2046) dwells). Here the value of average_power is the average value of powers with the same noncoherent integration time.

There are two different methods to declare success of coarse acquisition:

(1) When the first dwell at which the power is larger than a threshold TH1, coarse acquisition is declared successful for this dwell and the search is terminated. Thus this method requires less computational load but with a higher probability of false alarm.

(2) All dwells are searched with the same integration time. If multiple dwells have accumulated power larger than the threshold TH1, and their peak powers are not distinct (say, the power difference is less than 10%), a further confirmation process is needed, that is, add additional integrations until a clear peak has been obtained. This method is more reliable with less false alarm probability and may be associated with threshold ratio based acquisition. But it requires more computational load and time.

During the process of coarse acquisition, some dwells are removed from the search list because no signal exists in such a dwell. In this way, the number of dwells to do further search is decreased during every integration interval, thus saving a lot of computational load and memory. As shown in FIG. 2, the updated integration power is compared with the threshold TH2 every integration interval. If the accumulated power is less than the threshold TH2, the corresponding dwell can be removed from the list and the process need not search such a dwell in the remaining steps.

At the end of coarse acquisition, there are two possible scenarios:

1. Declare coarse acquisition at one (carrier frequency, code offset) dwell;

2. Cannot declare coarse acquisition after 120 ms noncoherent integration.

Whatever may be the scenario, the next stage or step is fine acquisition.

Fine Acquisition

In the case of scenario 1 just discussed above, the goal of fine acquisition is to fine tune carrier frequency. After coarse acquisition, the carrier frequency error might be as large as 250 Hz, which can not be tolerated in the PVT calculation. Normally a tracking loop is used to fine tune. However, a tracking loop is not adequate for very weak GPS signals.

In the case of scenario 2, the goal of fine acquisition is to improve sensitivity by using coherent integration instead of noncoherent integration. In this case, M (carrier frequency, code offset) dwells with highest powers are retained to enter fine acquisition later. A preferred value for M is 100 or less, but larger values may be used as well.

In order to unify the process for both scenarios, a FFT based coherent integration scheme for fine acquisition may be employed. Here a 128-point complex FFT of the latest received 120 ms of I, Q data is computed. The resulting frequency resolution is about 8 Hz. As shown in Table 1, the I, Q values are already available. So it is not necessary to wait for another 120 ms to collect enough I, Q data for this coherent integration. But this is at the cost of an increased memory requirement. A trade off between waiting time and memory usage may be made under these circumstances.

Figure 3:
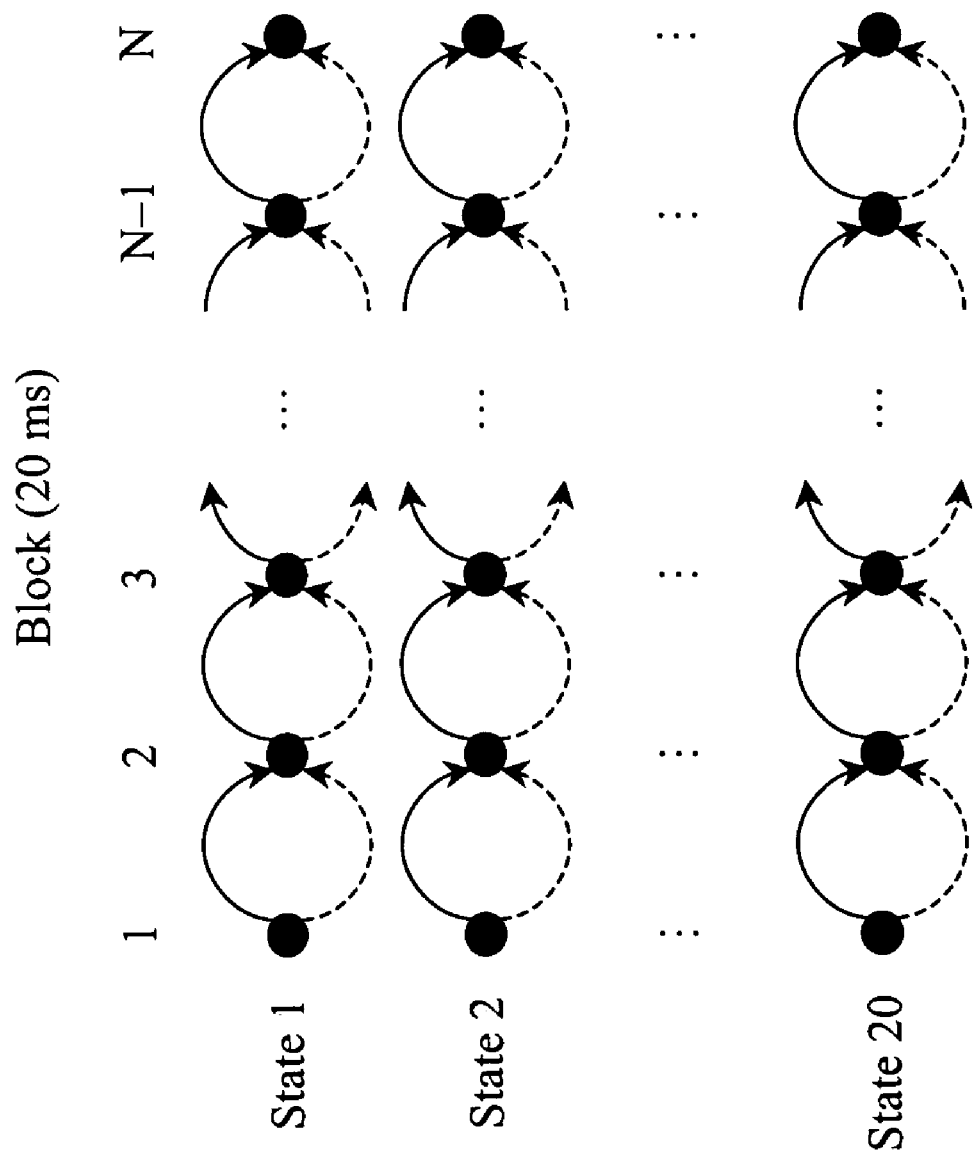
FIG. 3 is a trellis diagram of bit transition, where N is the number of navigation data bits in the fine acquisition integration length according to an embodiment of the present invention.

Because the integration time is 120 ms and more than 6 bits (20 ms per bit) are covered in this period, the number of patterns of possible data bit transitions is large because the number of patterns increases exponentially as the integration time increases. Obviously, the computational cost to do an exhaustive search (i.e., to try all possible bit transition patterns) is large. Instead of an exhaustive search, an optimal estimation algorithm is used which significantly reduces the computational load. Here accumulated power over 6 bits can be used as a cost function to arrive at an optimal data bit stream estimation. Because one data bit has a length of 20 milliseconds, every millisecond can be considered as a bit edge. When adopting this optimal estimation algorithm, the bit edge may be considered as a state. So, in total, there are 20 possible states. The resulting trellis diagram is shown in FIG. 3.

In the trellis diagram two paths emanate from each node. One path corresponds to data bit equal to 1, while the other corresponds that the data bit equal to 0. The cost function is the accumulated power. The survival path is the one with highest accumulated power. Obviously, only the survival branch can produce the maximum accumulated power at the end. In this way, half of the branches can be eliminated at every node. For a given state, the bit transition may occur once per 20 milliseconds. So, the status is updated every 20 ms instead of every millisecond.

The coherent integration time interval is assumed to be 120 ms and a 128-point complex FFT is computed. The input signal is represented as I(n), Q(n), where n=1, 2, . . . , 120

The technique for fine acquisition may be described as follows:

Step 1. Initialization of Each State

In this initialization, buf or buf(i,n) contains 128 values with the first 20 being the correlation values of first 20 milliseconds and remaining values set to 0, i.e., $$buf(i, n) = \begin{cases} I(n) + jQ(n) & i \le n < i + 20 \\ 0 & \text{otherwise} \end{cases} \quad (8)$$

where i=1,2, . . . , 20 is the index of state, n is the millisecond index within one data bit interval. In addition, $$\text{Buffer\_All}(i,k) = FFT(buf) k=1,2, \ldots ,128 \quad (9)$$

where k is the frequency index and Buffer_All(i,k) is the buffer to store the updated 128 points of FFT results. The buf(i,n) is in the time domain while Buffer_All(i,k) is in the frequency domain.

Here the different states are obtained by delay of one millisecond so that the computational load may be distributed. That is, the initial metric of state 1 at the 20th millisecond is obtained by using the samples from the 1st millisecond to the 20th millisecond. Afterwards the initial metric of state 2 at the 21st millisecond may be obtained by using the samples from the 2nd millisecond to the 21st millisecond, and so on.

Step 2. State Update

In this step, the FFT of correlation values within the second data bit is computed setting all other correlation values outside of the data bit to 0 and adding to or subtracting from the FFT values computed in step 1. The one with higher resulting value is retained. This procedure is continued with the succeeding data bits.

$$buf(i, n) = \begin{cases} I(n) + jQ(n) & i+20*B \leq n < i+20*B+20 \\ 0 & \text{otherwise} \end{cases} \quad (10)$$

where buf(i,n) contains 128 values with the actual 20 values in the range i+20*B to i+20*B+20 and 0's in the remaining positions. Here B is the index of the 20 millisecond block and n is the one millisecond index which has a range of 1 to 128. The index i is the state indicator, which indicates a different start interval on the next one millisecond edge, i.e., the state changes when the integration start time is moved by one millisecond. For an integration interval of 120 milliseconds the values of B are 1,2,3,4 and 5.

There are 2 branches at every node as given by:

$$\text{Branch1}(i,k) = \text{Buffer\_All}(i,k) + FFT(buf(i,n))k=1,2,\ldots,128 \quad (11)$$

$$\text{Branch2}(i,k) = \text{Buffer\_All}(i,k) - FFT(buf(i,n))k=1,2,\ldots,128 \quad (12)$$

The buf(i,n) is given by equation (10).

These two branches correspond to the input data bit (0 or 1) for the new 20 ms I, Q signals.

The survival branch may be selected by comparing the cost functions of the branches. Here the power associated with each of the frequency component is the cost function.

$$\text{Buffer\_All}(i,k) = \arg\max\ (|\text{Branch1}(i,k)|^2, |\text{Branch2}(i,k)|^2) \quad (13)$$

The N (N=128) point complex buffer Buffer_All contains all the possible paths for a given frequency bin.

Step 3. Final Stage

At the end of integration, the power associated with all the states are compared. The highest value is retained as the representative of this specific carrier frequency bin.

For an N-point FFT, there are N frequency bins. So the above optimal estimation algorithm is repeated for N frequency bins and N accumulated powers are generated. Among the N accumulated powers, if only one peak satisfies inequality (14) below, then a fine acquisition may be declared.

$$\frac{\text{peak}}{\text{average\_power}} > \text{Threshold}_{ratio} \quad (14)$$

where the peak value used in the numerator of (14) is the largest of the calculated accumulated power, and where average_power in the denominator of (14) is the average of the N accumulated power values:

$$\text{average\_power} = \sum_n (I_n^2 + Q_n^2) \quad (15)$$

The average_power value can be computed through non-coherent integration using Parseval's Theorem. The value of Threshold$_{ratio}$ is the preset ratio which may range from 1 to the number of frequency components. For example, in one embodiment, the value 1.2 is used for Threshold$_{ratio}$. However, because of the noise, false peaks might appear and sometimes there might be more than one peaks exceeding Threshold$_{ratio}$. Consequently, the correct frequency bin may be confirmed as follows.

Collect another 120 ms of I, Q data for the dwells with peak powers, and compute the FFT. If peak power remains at the same frequency bin in both the cases, assume that is the correct dwell. The trade-off is that we wait for another 120 ms but get confirmation.

It should be noted that for the 1st scenario, there is only 1 candidate (carrier frequency, code offset) dwell to search in the process of fine acquisition. While for the 2nd scenario, there are M candidate (carrier frequency, code offset) dwells to search.

The flowchart of FIG. 2 provides a summary of the technique described above. After initialization 200, the process checks at decision box 201 to see if an interrupt has been received. An interrupt indicates that the baseband has new I,Q samples ready for processing for the processor to start processing. After an interrupt is received, I and Q signal samples from the GPS baseband section are read at box 202, and the accumulated power values are updated at box 204. Next, decision box 205 checks if the power exceeds the threshold TH1. If so, the process enters fine acquisition at box 206. If not, decision box 207 checks if the power is less than threshold TH2. If so, the process quits the current dwell which involves changing either the frequency bin or code offset or both and continuing with a new dwell. If not, the process checks at decision box 209 if 120 ms of data have been collected yet. If so, then the process enters fine acquisition at box 210. If not, the process returns to decision box 201 to wait for the next interrupt. After fine acquisition is completed, as in box 206 or 210, the process continues to track the signal and simulataneously extract the embedded 50 bits/second navigational data.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

The invention claimed is:

1. A method implemented in a global satellite navigation receiver for acquisition of signals received from navigational satellites, the method comprising:

in a coarse acquisition phase:
for a selected dwell in a list of code-frequency dwells, calculating a non-coherent accumulated power from the signals,
if the non-coherent accumulated power is less than a low threshold value then eliminating the selected dwell from the list of code-frequency dwells and continuing the coarse acquisition phase,
if the non-coherent accumulated power is greater than a high threshold then initiating a fine acquisition phase using the selected dwell;
if a number of integration intervals for the selected dwell exceeds a predetermined duration then initiating the fine acquisition phase using the list of code-frequency dwells in the fine acquisition phase:

for a given dwell, calculating a fast Fourier transform of a set of recent signal samples to determine coherent accumulated powers for a set of frequencies, and discarding frequencies whose coherent accumulated powers are less than an average power.

2. The method of claim 1 wherein the average power is calculated from the set of recent signal samples based on Parseval's theorem.

3. The method of claim 1 wherein calculating the fast Fourier transform comprises determining navigation data bits using an optimal estimation algorithm.

4. The method of claim 3 wherein the optimal estimation algorithm comprises selecting a data sequence with maximum energy.

5. The method of claim 1 wherein calculating the non-coherent accumulated power comprises adding a square of an in-phase signal component and a square of a quadrature signal component to a prior non-coherent accumulated power.

6. The method of claim 1 wherein the high threshold is equal to the product of a constant power threshold, a number of integration intervals, and a power of a constant attenuation factor.

7. The method of claim 1 wherein the low threshold value is a function of a noise power level in a coherent integration interval.

8. The method of claim 1 further comprising: if multiple dwells have non-coherent accumulated powers greater than the high threshold, then performing additional integrations to obtain the selected dwell and initiating a fine acquisition phase using the selected dwell.

9. The method of claim 1 further comprising: if multiple frequencies remain after discarding frequencies whose coherent accumulated powers are less than the average power, then collecting additional signal samples and re-computing the fast Fourier transform.

10. A global satellite navigation system receiver device comprising an RF front end for receiving signals from navigational satellites, a baseband section receiving IF signals from the RF front end, and a processor receiving I,Q signal samples from the baseband section, wherein the processor implements a two-phase signal acquisition process comprising a coarse acquisition phase and a fine acquisition phase, wherein the coarse acquisition phase comprises:

for a selected dwell in a list of code-frequency dwells, calculating a non-coherent accumulated power from the signals, if the non-coherent accumulated power is less than a low threshold value then eliminating the selected dwell from the list of code-frequency dwells and continuing the coarse acquisition phase, if the non-coherent accumulated power is greater than a high threshold then initiating a fine acquisition phase using the selected dwell;

if a number of integration intervals for the selected dwell exceeds a predetermined duration then initiating the fine acquisition phase using the list of code-frequency dwells wherein the fine acquisition phase comprises:

for a given dwell, calculating a fast Fourier transform of a set of recent signal samples to determine coherent accumulated powers for a set of frequencies, and discarding frequencies whose coherent accumulated powers are less than an average power.

11. The device of claim 10 wherein the average power is calculated from the set of recent signal samples based on Parseval's theorem.

12. The device of claim 10 wherein calculating the fast Fourier transform comprises determining navigation data bits using an optimal estimation algorithm.

13. The device of claim 12 wherein the optimal estimation algorithm comprises selecting a data sequence with maximum energy.

14. The device of claim 10 wherein calculating the non-coherent accumulated power comprises adding a square of an in-phase signal component and a square of a quadrature signal component to a prior non-coherent accumulated power.

15. The device of claim 10 wherein the high threshold is equal to the product of a constant power threshold, a number of integration intervals, and a power of a constant attenuation factor.

16. The device of claim 10 wherein the low threshold value is a function of a noise power level in a coherent integration interval.

17. The device of claim 10 further comprising: if multiple dwells have non-coherent accumulated powers greater than the high threshold, then performing additional integrations to obtain the selected dwell and initiating a fine acquisition phase using the selected dwell.

18. The device of claim 10 further comprising: if multiple frequencies remain after discarding frequencies whose coherent accumulated powers are less than the average power, then collecting additional signal samples and re-computing the fast Fourier transform.

* * * * *